United States Patent [19]
Winterer

[11] Patent Number: 5,898,604
[45] Date of Patent: Apr. 27, 1999

[54] DIGITAL SIGNAL PROCESSOR EMPLOYING A RANDOM-ACCESS MEMORY AND METHOD FOR PERFORMING MULTIPLICATION

[75] Inventor: Martin Winterer, Gundelfingen, Germany

[73] Assignee: ITT Manufacturing Enterprises, Inc., Wilmington, Del.

[21] Appl. No.: 08/928,575

[22] Filed: Sep. 12, 1997

[30] Foreign Application Priority Data

Sep. 13, 1996 [DE] Germany .................. 196 37 369

[51] Int. Cl.⁶ ........................................... G06F 7/50
[52] U.S. Cl. ............................................ 364/757
[58] Field of Search ................... 364/757, 758, 364/759

[56] References Cited

U.S. PATENT DOCUMENTS

| | | | |
|---|---|---|---|
| 3,814,924 | 6/1974 | Tate | 364/757 |
| 4,190,894 | 2/1980 | Mudge | 364/758 |
| 4,484,301 | 11/1984 | Borgerding | 364/760.05 |
| 4,722,068 | 1/1988 | Kuroda et al. | 364/757 |
| 4,809,212 | 2/1989 | New et al. | 364/757 |
| 5,121,431 | 6/1992 | Wiener | 364/757 |

FOREIGN PATENT DOCUMENTS 9325959  12/1993  WIPO.

OTHER PUBLICATIONS

Patent Abstract of Japan, vol. 010, No. 162 (P–466), Jun. 10 1986 –& JP 61 015233A (SONYKK),Jan. 23 1986.

Murakami, "A Multiplier–Accumulator Macro For A 45 Mips Embedded RISC Processor", IEEE Journal of Solid–State Circuits, Bd.31, Nr. 7, Jul. 1996.

*Primary Examiner*—David H. Malzahn
*Attorney, Agent, or Firm*—Arthur L. Plevy

[57] ABSTRACT

The invention relates to a digital signal processor with a RAM (random-access memory) having its output connected to a first input and, through a first temporary storage device to a second input of a multiplier, with an adder following the multiplier, and with a clock device for controlling data-word transfers. The speed of the processor is increased by connecting a second auxiliary storage device between the RAM and the first input of the multiplier and providing a first switching element via which the RAM and the second temporary storage device are connectable to the first input of the multiplier.

17 Claims, 1 Drawing Sheet

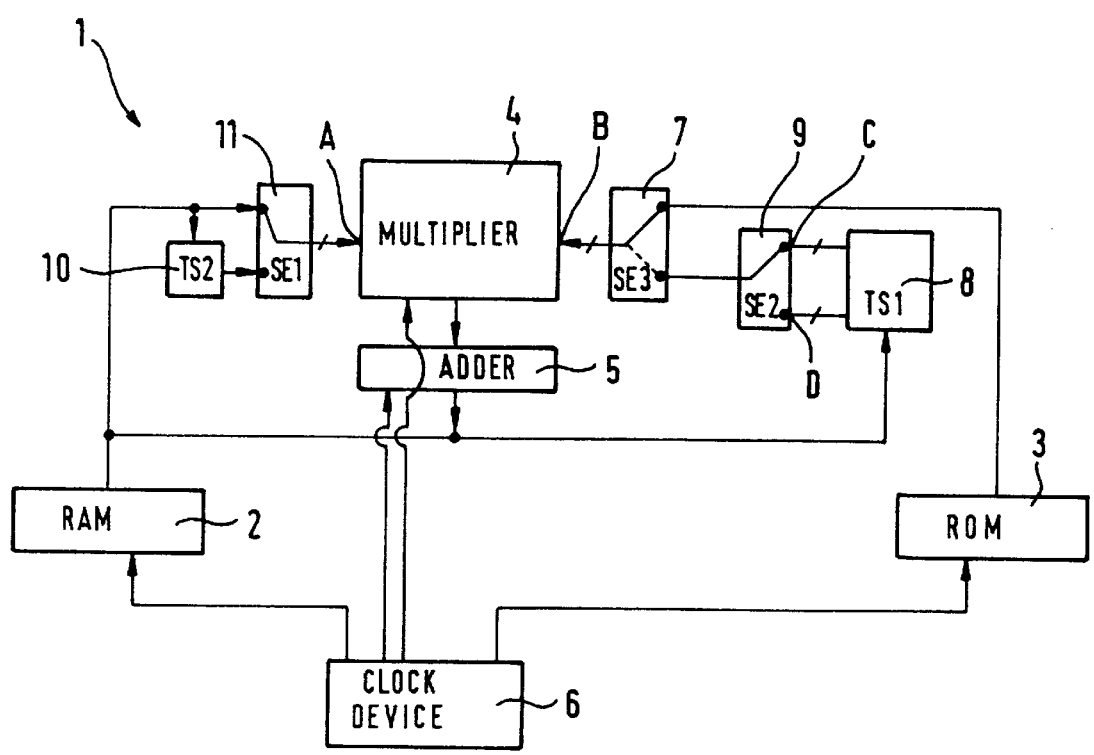

5,898,604

DIGITAL SIGNAL PROCESSOR EMPLOYING A RANDOM-ACCESS MEMORY AND METHOD FOR PERFORMING MULTIPLICATION

FIELD OF INVENTION

This invention relates to digital signal processors, and more particularly to digital signal processors employing random access memory.

BACKGROUND OF THE INVENTION

Certain digital signal processors (DSP's) include a random-access memory (RAM) for M-bit data words, a multiplier for multiplying a first, M-bit data word applied at a first input thereof by a second, N-bit data word applied at a second input thereof, with M being greater than N, the output of the RAM being connected to the first input and, through a first temporary storage device, to the second input of the multiplier, and the first temporary storage device being designed to output an applied M-bit data word as two successive partial words of bit lengths N and M-N, respectively. The digital signal processor further comprises an adder following the multiplier and a clock device for controlling data-word transfers.

The above digital signal processor has a simple structure. In particular, it requires few data memories. Thus, it takes up little space, which is particularly advantageous if the digital signal processor is integrated on a semiconductor wafer. In that case, expensive semiconductor material can be saved. Nevertheless, high throughput is ensured. Since the output of the RAM is connected to the first input and, through a temporary storage device, to the second input of the multiplier, two variables provided by the RAM can be multiplied. By the provision of the multiplier, whose second input can only receive an N-bit data word which is shorter than the data word provided by the RAM, further space can be saved.

A digital signal processor of the above type suffers from the drawback that many computing cycles are necessary if many M-bit data words are to be multiplied. For each multiplication, three periods of the clock signal supplied by the clock generator are needed. In the method for performing a multiplication, in a first step, an nth data word is loaded from the RAM into the first temporary storage device. In a second clock period, an n+1st data word transferred from the RAM to the first input of the multiplier is multiplied by the first partial word of the nth data word which is transferred from the first temporary storage device to the second input of the multiplier. In a third clock period, the n+1st data word applied from the RAM to the first input of the multiplier is multiplied by the second partial word of the nth data word which is applied from the first temporary storage device to the second input of the multiplier. These three steps are repeated with the subsequent data words which are taken from the RAM. n is an integer $\geq 1$. The bus of the RAM is occupied during each clock period.

The object of the invention is to provide a faster digital signal processor of the above type, and a faster method for performing a multiplication using a digital signal processor of the above type.

SUMMARY OF THE INVENTION

The digital signal processor of the invention comprises a RAM, a first temporary storage device, a second temporary storage device which enables faster operation, a first switching element, a multiplier, an adder, and a clock device.

The RAM is for M-bit data words. The multiplier is for multiplying a first M-bit data word applied at a first input thereof, by a second N-bit data word applied at a second input thereof, with M being greater than N, an output of the RAM being connected to the first input and, through the first temporary storage device, to the second input of the multiplier. The first temporary storage device is designed to output an applied M-bit data word as two successive partial words of bit length N and M-N, respectively. The adder follows the multiplier. The clock device is for controlling data-word transfers. The second temporary storage device is connected between the RAM and the first input of the multiplier. And, the first switching element is how the RAM and the second temporary storage device are connectable to the first input of the multiplier.

BRIEF DESCRIPTION OF THE FIGURE

The single FIGURE of the drawing shows an embodiment of a digital signal processor according to the invention.

DETAILED DESCRIPTION OF THE INVENTION

These objects are attained by providing a digital signal processor comprising a second temporary storage device, which is connected between the RAM and the first input of the multiplier, and a first switching element, by which the RAM and the second temporary storage device are connectable to the first input of the multiplier. In this arrangement, a data word can be loaded from the RAM into the second temporary storage device during the performance of a multiplication. In the next clock period, the data word stored in the second temporary storage device can then be used for the next multiplication, and at the same time a further data word can be loaded from the RAM into the first temporary storage device. To perform a multiplication of two M-bit data words, i.e., two multiplications by partial data words, only two clock periods are necessary. Since in both multiplications the data word presented to the first input of the multiplier is the same, it can be taken from the RAM in one clock period and from the second temporary storage device in the subsequent clock period, and be multiplied by the respective partial data word at the second input of the multiplier. Thus, the signal processor is considerably faster.

In a preferred embodiment of the invention, the first temporary storage device is followed by a second switching element whereby either of the partial data words can be applied to the second input of the multiplier. This is a simple implementation for dividing an M-bit data word into two partial words of bit length M and M-N, respectively, which can then be passed on successively via the switch.

In another preferred embodiment of the invention, a read-only memory is connectable instead of the RAM to the second input of the multiplier by means of a third switching element. Thus, changeover to the ROM is possible if a variable is to be multiplied by a constant.

Advantageously, the first temporary storage device is designed to be capable of outputting one data word and accepting one further data word during each clock period determined by the clock device. Such temporary storage devices are master-slave flip-flops, for example.

A preferred method for performing a multiplication with a digital signal processor according to the invention is characterized in that in a first clock period determined by the clock device, an nth data word is loaded from the RAM into the first temporary storage device, that in a second clock period, a multiplication of an n+1st data word transferred from the RAM to the first input of the multiplier and a first partial word of the nth data word transferred from the first temporary storage device to the second input of the multiplier is performed, and the n+1st data word from the RAM is stored in the second temporary storage device, that in a third clock period, a multiplication of the data word transferred from the second temporary storage device to the first input of the multiplier and a second partial word of the nth data word transferred from the first temporary storage device to the second input of the multiplier is performed, and an n+2nd data word from the RAM is stored in the first temporary storage device, and that the steps carried out in the second and third clock periods are repeated with the subsequent data words. In that case, as stated above, two clock periods are required to perform a multiplication of two variable data words of bit length M. Only at the start, i.e., in the first clock period, must the value from the RAM be additionally loaded into the first temporary storage device, so that a total of three clock periods are necessary for the multiplication. Thereafter, the corresponding data word was loaded into the first temporary storage device during the respective preceding multiplication, so that only two clock periods are necessary.

The invention will now be explained in more detail with reference to the accompanying drawing.

The signal processor, generally referenced by the numeral 1, comprises a random-access memory (RAM) 2, a read-only memory (ROM) 3, a multiplier 4, and an adder or accumulator 5. Implementations of these elements of signal processor 1 are familiar to those skilled in the art. RAM 2 can make available variable data words (state variables), and ROM 3 can make available constant data words (constant coefficients).

In a first operating state of signal processor 1, state variables can be transferred from RAM 2 to the first input A of multiplier 4. The state variables are data words of bit length M. From ROM 3, constant coefficients can be transferred to the second input B of multiplier 4. The constant coefficients are data words of bit length N, with M being greater than N. The multiplier is designed as an M×N multiplier. After the multiplication in multiplier 4, the result is passed to adder 5, where it may also be stored and added to further results from multiplier 4. The signals for passing on the data words are provided to the respective elements of signal processor 1 by a clock device (clock generator) 6.

In a second operating state of signal processor 1, two variable data words can be multiplied. To this end, the ROM is decoupled from the second input B of multiplier 4 via a third switching element 7 (SE3). The second input B of multiplier 4 is connected via a second switching element 9 (SE2) to a first temporary storage device 8 (TS1), in which a data word from RAM 2 can be stored. Thus, variable data words can be transferred from RAM 2 to both inputs of multiplier 4. The data words from RAM 2 have a length of M bits. In the first temporary storage device 8 (TS1), such a data word is divided into two partial words of bit lengths N and M-N, respectively. Via the second switching element 9 (SE2), these partial data words are transferred successively to the second input B of multiplier 4. Between RAM 2 and the first input A of multiplier 4, a second temporary storage device 10 (TS2) is provided. Via the first switching element 11 (SE1), the first input A of multiplier 4 can be connected either to RAM 2 or to the second temporary storage device 10 (TS2). Possible implementations of switching elements and temporary storage devices are familiar to those skilled in the art; for the temporary storage devices, register memories are preferably used.

To perform a multiplication of two variable data words from RAM 2, two periods of the clock from clock device 6 are needed. At the beginning of the process, an additional clock period, referred to here as "first clock period", is necessary. During the first clock period, a data word Y1 is loaded from RAM 2 into the first temporary storage device 8 (TS1). The data word Y1, which is M bits long, is divided into two partial words. The first partial word, which has a length of N bits (high part), is applied to the first input C of the second switching element 9 (SE2), and the second partial word, which has a length of M-N bits (low part), is applied to the second input D of the second switching element 9 (SE2).

During the second clock period, a data word X1, which is transferred from RAM 2 to the first input A of multiplier 4, is multiplied by the partial data word Y1 of bit length N (high part), which is applied to the second input B of the multiplier via the first input C of the second switching element 9 (SE2). At the same time, the data word X1 is loaded from RAM 2 into the second temporary storage device 10 (TS2).

During the third clock period, the data word X1 is applied from the second temporary storage device 10 (TS2) through the first switching element 11 (SE1) to the first input A of the multiplier. The partial word Y1 of bit length M-N (low part) is applied via the input D of the second switching element 9 (SE2) to the second input B of multiplier 4. There, X1 is multiplied by Y1, low part. At the same time, the subsequent data word Y2 is loaded from RAM2 into the first temporary storage device 8 (TS1).

In these three clock periods, the multiplication of the data words X1 and Y1, which are taken successively from RAM 2, is performed. The results of the multiplication are added up in adder 5. For the subsequent multiplication of the data words X2 and Y2 to be taken from RAM 2, the step explained above for the first clock period was already performed, since during the third clock period the data word Y2 was loaded into the first temporary storage device 8 (TS1). Thus, for the second multiplication, i.e., the multiplication of the data words X2 and Y2, it is only necessary to carry out the steps performed in the second and third clock periods with the corresponding data words. The same applies to the subsequent multiplications of further data words from RAM 2. This process is continued until multiplication of two variable data words from RAM 2 is required. Then, by setting switching element 7 (SE3) to the other position, the output of ROM 3 can be connected to the second input B of multiplier 4 again. Multiplications of a variable and a constant can then be performed.

The method according to the invention is especially switchable for use in adaptive filters for, e.g., echo cancellation in telephones and in filter banks for, e.g., noise suppression or source coding.

We claim:

1. A digital signal processor comprising:

a RAM (random-access memory) for M-bit data words;

a multiplier, for multiplying a first M-bit data word applied at a first input thereof, by second N-bit data word applied at a second input thereof, with M being greater than N, an output of the RAM being connected to the first input and, through a first temporary storage device, to the second input of the multiplier, the first temporary storage device being designed to output an applied M-bit data word as two successive partial words of bit length N and M-N, respectively;

an adder, coupled to said multiplier;

a clock device coupled to said adder for controlling transferring of data;

a second temporary storage device, which is connected between the RAM and the first input of the multiplier; and, a first switching element, by which the RAM and the second temporary storage device are connectable to the first input of the multiplier.

2. The digital signal processor of claim 1, further comprising a second switching element, which follows the first temporary storage device, for applying either of the partial data words to the second input of the multiplier.

3. The digital signal processor of claim 2, wherein the first temporary storage device is designed to be capable of outputting one data word and accepting one further data word during each clock period defined by the clock device.

4. The digital signal processor claim 2, wherein a read-only memory which is connectable, instead of the RAM, to the second input of the multiplier by means of a third switching element.

5. The digital signal processor of claim 4, wherein the first temporary storage device is designed to be capable of outputting one data word and accepting one further data word during each clock period defined by the clock device.

6. The digital signal processor of claim 1, wherein a ROM (read-only memory) is connectable, instead of the RAM, to the second input of the multiplier by means of a third switching element.

7. The digital signal processor of claim 6, wherein the first temporary storage device is designed to be capable of outputting one data word and accepting one further data word during each clock period defined by the clock device.

8. The digital signal processor of claim 1, wherein the first temporary storage device is designed to be capable of outputting one data word and accepting one further data word during each clock period defined by the clock device.

9. A method for performing a multiplication with a digital signal processor comprising the steps of:

in a first clock period defined by a clock device, loading an nth data word from a RAM into a first temporary storage device;

in a second clock period defined by said clock device, multiplying an n+1st data word transferred from the RAM to a first input of a multiplier and a first partial word of the nth data word transferred from the first temporary storage device to a second input of the multiplier, and storing the n+1st data word in a second temporary storage device; and, in a third clock period defined by said clock device, multiplying a data word transferred from the second temporary storage device to the first input of the multiplier and a second partial word of the nth data word transferred from the first temporary storage device to the second input of the multiplier, and storing an n+2nd data word from the RAM in the first temporary storage device; and, repeating the steps carried out in the second and third clock periods with the subsequent data words delivered by the RAM.

10. The method of claim 9, wherein the digital signal processor further comprises a second switching element, which follows the first temporary storage device, for applying either of the partial data words to the second input of the multiplier.

11. The method of claim 10, wherein the first temporary storage device is designed to be capable of outputting one data word and accepting one further data word during each clock period defined by the clock device.

12. The method of claim 10, wherein a ROM (read-only memory) is connectable, instead of the RAM, to the second input of the multiplier by means of a third switching element.

13. The method of claim 12, wherein the first temporary storage device is designed to be capable of outputting one data word and accepting one further data word during each clock period defined by the clock device.

14. The method of claim 9, wherein a ROM (read-only memory) is connectable, instead of the RAM, to the second input of the multiplier by means of a third switching element.

15. The method of claim 14, wherein the first temporary storage device is designed to be capable of outputting one data word and accepting one further data word during each clock period defined by the clock device.

16. The method of claim 9, wherein the first temporary storage device is designed to be capable of outputting one data word and accepting one further data word during each clock period defined by the clock device.

17. A method for performing a multiplication with a digital signal processor comprising the steps of:

during a first clock period:
loading a data-word N from a RAM into a first temporary storage device;
dividing said data-word N into a first partial word and a second partial word;
applying said first partial word to a first input of a first switching element; and,
applying said second partial word to a second input of said first switching element;

during a second clock period:
transferring a second data word from RAM to first input of a multiplier;
applying said first partial word to a second input of said multiplier via said first input of said first switching element;
multiplying said second data word by said first partial word using said multiplier; and,
loading said second data word from RAM into a second temporary storage device; and, during a third clock period:
applying said second data word from said second temporary storage device through a second switching element to said first input of said multiplier;
applying said second partial word via said second input of said first switching element to said second input of said multiplier;
multiplying said second data word by said second partial word; and,
loading a data-word N+1 from RAM into said first temporary storage device.

* * * * *